United States Patent
Choi et al.

(10) Patent No.: US 11,964,885 B2
(45) Date of Patent: Apr. 23, 2024

(54) TANDEM ELECTRODIALYSIS CELL SYSTEMS BASED ON THE USE OF REDOX COUPLES

(71) Applicant: Wisconsin Alumni Research Foundation, Madison, WI (US)

(72) Inventors: Kyoung-Shin Choi, Fitchburg, WI (US); Dohwan Nam, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 515 days.

(21) Appl. No.: 17/172,558

(22) Filed: Feb. 10, 2021

(65) Prior Publication Data

US 2022/0250955 A1   Aug. 11, 2022

(51) Int. Cl.
*B01D 61/48* (2006.01)
*C02F 1/469* (2023.01)
*C02F 103/08* (2006.01)

(52) U.S. Cl.
CPC ............ *C02F 1/4695* (2013.01); *B01D 61/48* (2013.01); *B01D 2255/20723* (2013.01); *C02F 2103/08* (2013.01); *C02F 2201/46* (2013.01)

(58) Field of Classification Search
CPC .... B01D 61/422; B01D 61/423; B01D 61/44; C02F 1/4693
See application file for complete search history.

(56) References Cited

U.S. PATENT DOCUMENTS

| | | | |
|---|---|---|---|
| 3,239,442 A | 3/1966 | Tirrell | |
| 3,752,749 A | 8/1973 | Chlanda et al. | |
| 10,821,395 B2 | 11/2020 | Beh et al. | |
| 2006/0219574 A1 | 10/2006 | Rahman et al. | |
| 2009/0314718 A1* | 12/2009 | Sparrow | B01D 61/50 210/243 |
| 2016/0152492 A1 | 6/2016 | Bhikhi et al. | |

(Continued)

FOREIGN PATENT DOCUMENTS

| | | |
|---|---|---|
| JP | 04-018919 | 1/1992 |
| JP | 2015-167922 | 9/2015 |

OTHER PUBLICATIONS

Zhan et al., "Emerging soluble organic redox materials for next-generation grid energy-storage applications," MRS Communications, May 2020.

(Continued)

*Primary Examiner* — Bradley R Spies

(74) *Attorney, Agent, or Firm* — Bell & Manning, LLC

(57) ABSTRACT

Tandem electrodialysis (ED) cell systems and methods for using the tandem ED cell systems to extract and recover ions from ion-containing solutions are provided. The tandem ED cell systems are composed of ion-extraction and ion-recovery ED cells. A redox couple contained in the anolyte of the ion-extraction ED cell is different from a redox couple contained in the catholyte of the ion-extraction ED cell. The electrode reactions in the ion-extraction ED cell are reversed in the ion-recovery ED cell, with the anolyte and catholyte of the two ED cells swapped and continuously circulated. As a result, the redox species in the anolyte and catholyte of the two cells are never depleted, which allows for achieving ion extraction and ion recovery with the use of a minimal amount of the redox couples.

16 Claims, 6 Drawing Sheets

(56) References Cited

U.S. PATENT DOCUMENTS

| | | | |
|---|---|---|---|
| 2017/0250434 A1 | 8/2017 | Gennett et al. | |
| 2018/0141834 A1 | 5/2018 | Wessling et al. | |
| 2019/0046927 A1* | 2/2019 | Bhikhi | B01D 61/50 |
| 2019/0240623 A1 | 8/2019 | Beh et al. | |
| 2020/0070094 A1 | 3/2020 | Hussaini et al. | |
| 2020/0140296 A1 | 5/2020 | Choi et al. | |
| 2020/0164312 A1* | 5/2020 | Beh | B01D 61/46 |

OTHER PUBLICATIONS

Nam et al., "Tandem Desalination/Salination Strategies Enabling the Use of Redox Couples for Efficient and Sustainable Electrochemical Desalination," *ACS Appl. Mater. Interfaces*, 2019, 11, 38641-38647.

Kasumah et al., "Study on Organic Redox Flow Battery Mechanism Using TEMPO and FMN-Na Solutions," Reaktor, vol. 19 No. 3, Sep. 2019, pp. 96-100.

Desai et al., "Electrochemical Desalination of Seawater and Hypersaline Brines with Coupled Electricity Storage," *ACS Energy Lett.* 2018, 3, 375-379.

Gratzel et al., Photoelectrochemical Cells, Nature, vol. 414, Nov. 2001, pp. 338-344.

Liu et al., A Total Organic Aqueous Redox Flow Battery Employing a Lost Cost and Sustainable Methyl Viologen Anolyte and 4-HO-TEMPO Catholyte, Adv. Energy Mater., vol. 6, 2015, 8 pages.

Nutting et al., Tetramethylpiperidine N-Oxyl (TEMPO), Phthalimide N-Oxyl (PINO), and Related N-Oxyl Species: Electrochemical Properties and Their Use in Electrocatalytic Reactions, Chem. Rev., 2018, 118 (9), pp. 4834-4885.

Ciriminna et al., Industrial Oxidations with Organocatalyst TEMPO and Its Derivatives *Org. Process Res. Dev.*, 2010, 14 (1), pp. 245-251.

Gerischer, Heinz, Electrochemical Photo and Solar Cells Principles and Some Experiments, Electroanalytical Chemistry and Interfacial Electrochemistry, 58, 1975, pp. 263-274.

Sadrzadeh et al., "Sea water desalination using electrodialysis," Desalination 221 (2008) pp. 440-447.

International Search Report and Written Opinion issued on PCT/US2019/055507, dated Jan. 23, 2020.

International Search Report and Written Opinion for PCT/US2022/013110, dated May 3, 2022.

Debruler et al., "Integrated saltwater desalination and energy storage through a pH neutral aqueous organic redox flow battery," Advanced Functional Materials, Apr. 27, 2020, vol. 30, No. 24, Article No. 2000385.

\* cited by examiner

TANDEM ELECTRODIALYSIS CELL SYSTEMS BASED ON THE USE OF REDOX COUPLES

REFERENCE TO GOVERNMENT RIGHTS

This invention was made with government support under 1803496 awarded by the National Science Foundation. The government has certain rights in the invention.

BACKGROUND

The lack of access to fresh water is one of the most serious issues that the world is facing. Considering the abundance of seawater on Earth, seawater desalination has the possibility to offer a sustainable and unlimited supply of fresh water. Distillation and reverse osmosis (RO) have been used for seawater desalination, with RO being the more cost-effective option. However, the cost of RO is still high due to the considerable electrical energy input required to operate high pressure pumps.

Another desalination technology, which has been used for brackish water desalination, is electrodialysis (ED). The key difference between ED and distillation and RO is that ED removes salt ions from saline water, while distillation and RO remove water from the saline water. Considering the amounts of salt and water present in seawater, ED should be able to achieve desalination with higher recovery of water at a lower cost than RO. However, while ED is a cost-effective method for brackish water desalination, it is currently less cost-effective than RO for seawater desalination. This is because the current electrode reactions used in ED cells to induce ion movement require a high operating voltage.

ED cells for desalination using redox couples to drive the desalination and salination cycles have been proposed but limitations inherent in these ED cells leave room for improvement.

SUMMARY

Tandem ED cell systems and methods for using the tandem ED cell systems to extract and recover ions from ion-containing solutions are provided.

One embodiment of a tandem ion extraction and recovery includes one or more ion-extraction electrodialysis cells and one or more ion-recovery electrodialysis cells. The one or more ion-extraction electrodialysis cells include: a first solution comprising a first redox couple in an anode compartment that is compartmentalized by an anion exchange membrane; a second solution comprising a second redox couple in a cathode compartment that is compartmentalized by a cation exchange membrane, wherein the first and second redox couples are different redox couples; an ion-extraction compartment comprising an ion-containing solution comprising dissolved cations and dissolved anions between the anode compartment and the cathode compartment; an anode in contact with the first solution in the anode compartment; and a cathode in contact with the second solution in the cathode compartment. The one or more ion-recovery electrodialysis cells include: the second solution comprising the second redox couple in an anode compartment that is compartmentalized by a cation exchange membrane; the first solution comprising the first redox couple in a cathode compartment that is compartmentalized by an anion exchange membrane; an ion-recovery compartment comprising an ion-recovery solution between the anode compartment and the cathode compartment; an anode in contact with the second solution in the anode compartment; and a cathode in contact with the first solution in the cathode compartment. One or more conduits connect the one or more anode compartments of the one or more ion-extraction electrodialysis cells with the one or more cathode compartments of the one or more ion-recovery electrodialysis cells, such that the one or more conduits allow the first solution to circulate between the one or more anode compartments of the one or more ion-extraction electrodialysis cells and the one or more cathode compartments of the one or more ion-recovery electrodialysis cells. In addition, one or more conduits connect the one or more cathode compartments of the one or more ion-extraction electrodialysis cells with the one or more anode compartments of the one or more ion-recovery electrodialysis cells, such that the one or more conduits allow the second solution to circulate between the one or more cathode compartments of the one or more ion-extraction electrodialysis cells and the one or more anode compartments of the one or more ion-recovery electrodialysis cells.

One embodiment of a method for extracting and recovering dissolved ions from solution includes the steps of: circulating a first solution comprising a reduced species and an oxidized species of a first redox couple between one or more anode compartments of one or more ion-extraction electrodialysis cells and one or more cathode compartments of one or more ion-recovery electrodialysis cells; circulating a second solution comprising a reduced species and an oxidized species of a second redox couple between one or more cathode compartments of the one or more ion-extraction electrodialysis cells and one or more anode compartments of the one or more ion-recovery electrodialysis cells; oxidizing the reduced species of the first redox couple in the one or more anode compartments of the one or more ion-extraction electrodialysis cells and reducing the oxidized species of the second redox couple in the one or more cathode compartments of the one or more ion-extraction electrodialysis cells, thereby causing anions from an ion-containing solution in an ion-extraction compartment of each of the one or more ion-extraction electrodialysis cells to move into the anode compartment of the ion-extraction electrodialysis cell and cations from the ion-containing solution to move into the cathode compartment of the ion-extraction electrodialysis cell; and reducing the oxidized species of the second redox couple in the one or more cathode compartments of the one or more ion-recovery electrodialysis cells and oxidizing the reduced species of the first redox couple in the one or more anode compartments of the one or more ion-recovery electrodialysis cells, thereby causing anions from the anode compartment of each of the one or more ion-recovery electrodialysis cells to move into an ion-recovery compartment of the ion-recovery electrodialysis cell and cations from the cathode compartment of each of the one or more ion-recovery electrodialysis cells to move into the ion-recovery compartment of the ion-recovery electrodialysis cell.

BRIEF DESCRIPTION OF THE DRAWINGS

Illustrative embodiments of the invention will hereafter be described with reference to the accompanying drawings, wherein like numerals denote like elements.

FIG. 1A illustrates a conventional desalination ED cell. FIG. 1B shows an ion-extraction ED cell that uses two different redox couples in the anolyte and the catholyte. The redox couples are chosen such that the overall cell reaction is spontaneous and generates an electrical energy output. FIG. 1C shows an ion-recovery ED cell that uses two different redox couples in the anolyte and the catholyte. FIG. 1D shows a tandem cell system that operates an ion-extraction ED cell and an ion-accumulation ED cell in tandem.

DETAILED DESCRIPTION

Tandem ED cell systems and methods for using the tandem ED cell systems to extract and recover ions from ion-containing solutions are provided. The tandem ED cell system is composed of ion-extraction and ion-recovery ED cells. The redox couple contained in the anolyte of the ion-extraction ED cell is different from the redox couple contained in the catholyte of the ion-extraction ED cell. The electrode reactions in the ion-extraction ED cell are reversed in the ion-recovery ED cell, with the anolyte and catholyte of the two ED cells swapped and continuously circulated. As a result, the redox species in the anolyte and catholyte of the two cells are never depleted, which allows for achieving ion extraction and ion recovery with the use of a minimal amount of the redox couples. Some embodiments of the ion-extraction and ion-recovery ED cells use photoelectrodes to convert solar energy into electricity while carrying out the ion-extraction and ion-recovery processes, thereby coupling the functions of ion-extraction and solar electricity generation in a single device.

In the tandem ED cell systems, the redox couple used in the anolyte differs from the redox couple used in the catholyte. Thus, the tandem ED cell systems described herein are distinguishable from previously reported tandem ED cell systems where the redox couple used in the anolyte and catholyte are the same. (U.S. Patent Application Publication Number 2020/0140296). The use of different redox couples allows the charges of the two redox couples to be individually optimized to minimize the leakage of the redox couples through the anion exchange membranes (AEMs) and the cation exchange membranes (CEMs) of the ED cells. In addition, a more selective use of redox couples comprising species that are unstable in the presence of certain cations or anions extracted from the feed water to the anolyte or catholyte is possible.

A redox couple is composed of an oxidized form and a reduced form of a molecular or ionic species. Redox couples that have extremely fast oxidation and reduction kinetics are often called redox mediators because they can be used to mediate other oxidation and reduction reactions. The redox couples used in the ED cells described herein include redox couples that are known as redox mediators. However, in the present ED cells, they are not used to mediate other redox reactions. Instead, the oxidation and reduction reactions of the redox mediators are directly used to operate the ED cells to take advantage of their fast redox kinetics.

Figure 1A:
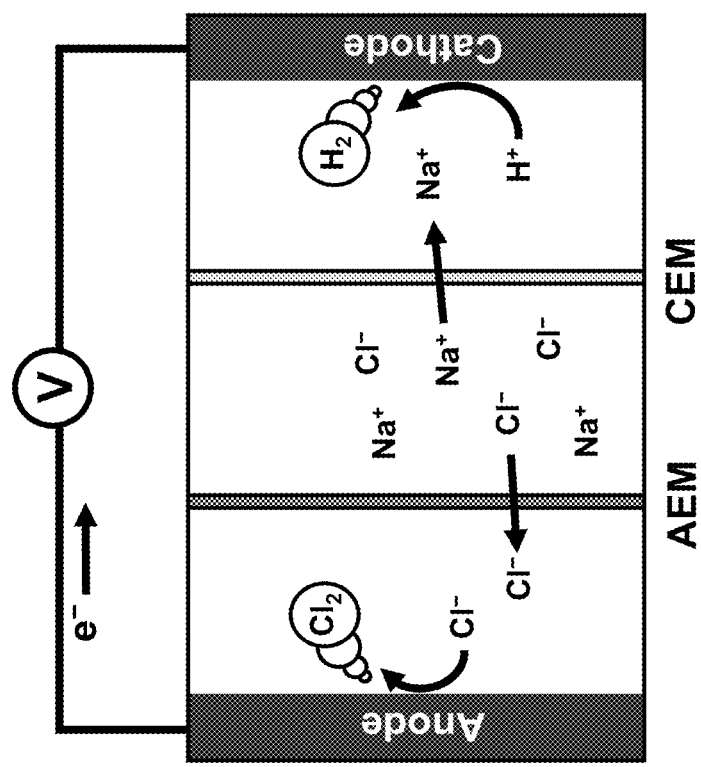
FIGS. 1A-1D show schematic diagrams of the desalination of a saline solution by ED cells.

A schematic diagram of a conventional ion-extraction ED cell having three compartments is shown in FIG. 1A. Oxidation occurs in the anode compartment of the cell, resulting in the consumption of anions or the generation of cations, depending upon whether anions or neutral molecules are being oxidized, and reduction occurs in the cathode compartment, resulting in the consumption of cations or the generation of anions, depending upon whether cations or neutral molecules are being reduced. In the ED cell shown in FIG. 1A, $Cl^-$ anions undergo oxidation in the anode compartment, and $H^+$ cations undergo reduction in the cathode compartment.

To maintain charge neutrality, anions (for example, $Cl^-$ ions) from the middle compartment, which contains anions and cations in an electrolyte solution (for example, saline water), will move toward the anode through an anion exchange membrane (AEM) while cations (for example, $Na^+$ ions) will move toward the cathode through a cation exchange membrane (CEM). This results in the extraction of ions from the solution in the middle compartment. However, this is only an illustrative example. The cations and anions removed from the middle compartment need not be $Na^+$ cations and $Cl^-$ anions; the ED cells can be used to remove any cations and/or anions present in a solution in the middle compartment to maintain the charge neutrality of the anolyte and catholyte.

The most commonly used cathode and anode reactions in a conventional ED cell are water reduction and water oxidation or $Cl^-$ oxidation, respectively. These reactions are kinetically slow and require considerable kinetic overpotentials. Thus, a conventional ED cell can be made more efficient by using the oxidation and reduction of redox couples present in the anolyte and the catholyte to drive ion-extraction.

Figure 1C:
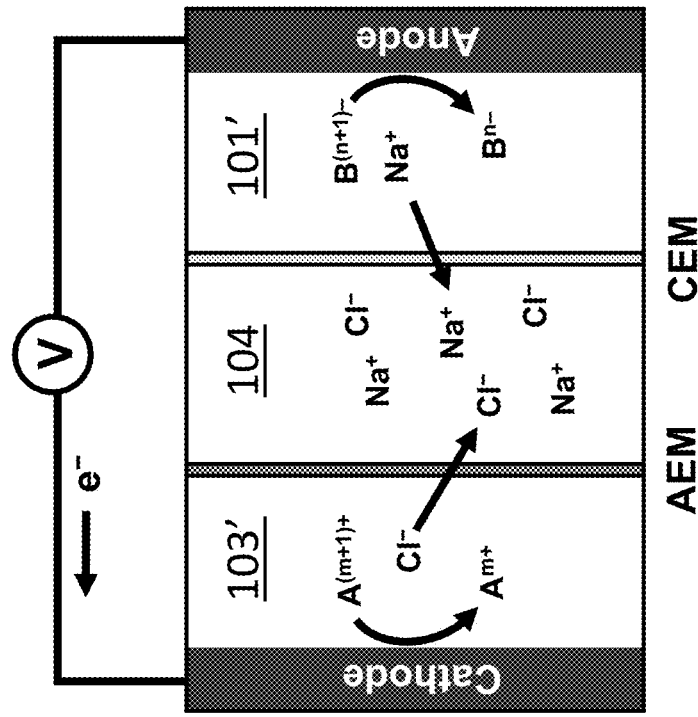
Figure 1B:
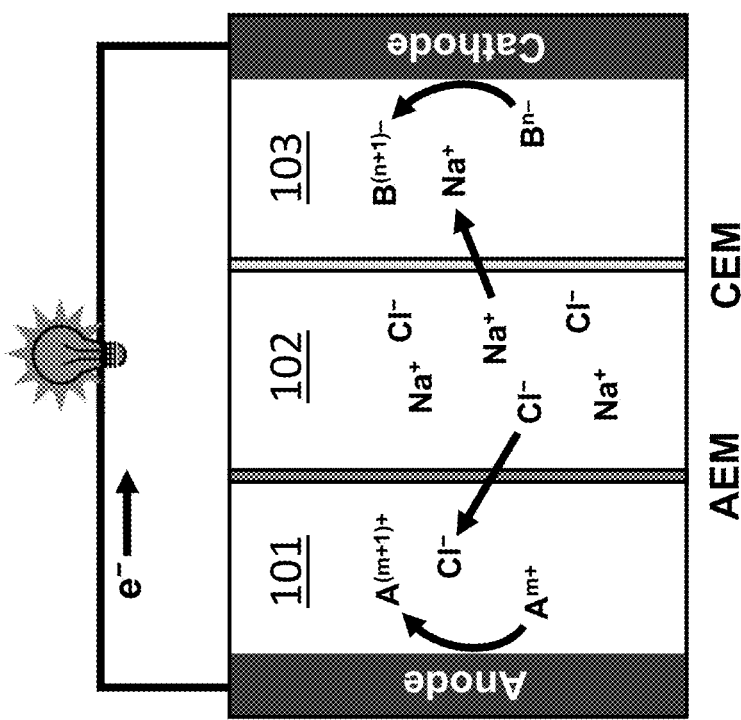

The ED cell shown in FIG. 1B illustrates the use of redox mediators present in the anolyte and the catholyte as electrode reactions to drive ion-extraction. The ED cell contains three compartments, where an anode compartment 101 containing the anolyte and cathode compartment 103 containing the catholyte sandwich a middle compartment 102 containing the ion-containing solution. Compartment 102 is referred to as the ion-extraction compartment or, when the ion-extraction is a desalination, as the desalination compartment. For the desalination process shown in FIG. 1B, the solution in compartment 102 can be, for example, saline water from a natural body of water (e.g., seawater, salt lake water, brackish water, or a geothermal brine).

The anolyte contains a first redox couple (represented generically as $A^{m+}/A^{(m+1)+}$, where m is an integer) having oxidized and reduced species that are positively charged. The catholyte contains a second redox couple (represented generically as $B^{n-}/B^{(n+1)-}$, wherein n is an integer) having oxidized and reduced species that are negatively charged. The anode compartment and middle compartment are separated by an AEM, while the cathode compartment and middle compartment are separated by a CEM. Thus, the AEM serves to compartmentalize the anode compartment and the CEM serves to compartmentalize the cathode compartment. Notably, because neither the reduced species nor the oxidized species of the redox couple dissolved in the anolyte solution is an anion (in the illustrative embodiment of FIG. 1B, the redox couple of the anolyte comprises two cations), leakage of the anolyte redox couple into ion-extraction compartment 102 is minimized or prevented. Similarly, because neither the reduced species nor the oxidized species of the redox couple dissolved in the catholyte solution is a cation (in the illustrative embodiment of FIG. 1B, the redox couple of the catholyte comprises two anions), the leakage of the catholyte redox couple into ion-extraction compartment 102 is minimized or prevented.

Although the reduced and oxidized forms of the anolyte redox couple in FIG. 1B are shown to be both cations, redox couples in which the reduced form is a neutral species can also be used ($A^{m+}$ when m=0). Similarly, although the reduced and oxidized forms of the catholyte redox couple in FIG. 1B are shown to be both anions, redox couples in which the oxidized form is a neutral species can also be used ($B^{n-}$ when n=0).

Examples of redox couples that can be used in the ED cells include the reduced and oxidized forms of 1,1'-bis[3-(trimethylammonio)-propyl]ferrocene ([BTMAP-Fc]$^{2+}$/[BTMAP-Fc]$^{3+}$), ferricyanide ([Fe(CN)$_6$]$^{3-}$/[Fe(CN)$_6$]$^{4-}$), 2,2,6,6-tetramethyl-1-piperidinyloxy (TEMPO/TEMPO$^+$), 4-hydroxy-2,2,6,6-tetramethylpiperidine 1-oxyl (TEMPOL/TEMPOL$^+$), methyl viologen (($C_6H_7N)_2^+$/($C_6H_7N)_2^{2+}$; MV$^+$/MV$^{2+}$), and riboflavin-5'-phosphate sodium salt dihydrate (FMN-Na$_2$/FMN-Na). The reduced and oxidized forms of other TEMPO derivatives can also be used, including the reduced and oxidized forms of 4-maleimido-TEMPO, 4-carboxy-TEMPO, 4-amino-TEMPO, 4-methoxy-TEMPO, 4-oxo-TEMPO, TEMPO-4-amino-4-carboxylic acid, 4-acetamido-TEMPO, and 4-(2-Iodoacetamido)-TEMPO. The list of redox couples provided here is not intended to be exhaustive. Other redox couples, including other ferrocene derivatives and other viologen derivatives, can be used. In addition, the various species of the redox couples can comprise metal ions, metal complexes, halides, polyhalides, sulfides, polysulfides, quinone derivatives, phenazine derivatives, alloxazine derivatives, flavin derivatives, metallocene derivatives, nitroxide radical derivatives, N,N-dialkyl-N-oxoammonium derivatives, and the like.

An anode is in contact with the anolyte in anode compartment 101, and a cathode is in contact with catholyte in cathode compartment 103. The anode and cathode can be, for example, carbon-containing electrodes, such as graphite, carbon felt, and carbon paper electrodes. However, other electrode materials, such as metals, can be used. When a voltage is applied between the anode and the cathode, $A^{m+}$ is oxidized to $A^{(m+1)+}$ at the anode, increasing the cationic charge and thus causing anions (e.g., Cl$^-$ ions) to move from the middle compartment to the anolyte in the anode compartment to keep the charge neutrality in the anode compartment. At the same time, $B^{n-}$ is reduced to $B^{(n+1)-}$ at the cathode, increasing the anionic charge and thus causing cations (e.g., Na$^+$ ions) from the middle compartment to move to the catholyte in the cathode compartment to keep the charge neutrality in the cathode compartment. This results in extraction of ions from the solution in the middle compartment. Thus, this cell serves as an ion-extraction ED cell.

When the anode compartment is depleted of $A^{m+}$ and the cathode compartment is depleted of $B^{n-}$, the ion-extraction ED cell can no long operate. Then, $A^{m+}$ and $B^{n-}$ need to be regenerated by performing the reverse reactions in an ion-recovery ED cell.

The ion-recovery ED cell is shown in FIG. 1C. The cell setup is the same as that of the ion-extraction ED cell, but the anode compartment becomes the cathode compartment, and the cathode compartment becomes the anode compartment. The anode compartment 101' and middle compartment 104 of the ion-recovery ED cell are separated by a CEM, while the cathode compartment 103' and middle compartment 104 are separated by an AEM. Thus, the CEM serves to compartmentalize the anode compartment and the AEM serves to compartmentalize the cathode compartment.

An anode is immersed in the anolyte in anode compartment 101' and a cathode is immersed in the catholyte in cathode compartment 103'.

When a voltage is applied between the anode and the cathode, $B^{(n+1)-}$ is oxidized to $B^{n-}$ at the anode, decreasing the anionic charge and thus causing cations (e.g., Na$^+$ ions) to move from the anode compartment to the middle compartment to keep the charge neutrality in the anode compartment. At the same time, $A^{(m+1)+}$ is reduced to $A^{m+}$ at the cathode, decreasing the cationic charge and thus causing anions (e.g., Cl$^-$ ions) from the cathode compartment to move to the middle compartment to keep the charge neutrality in the cathode compartment. This results in the accumulation of ions in the solution in the middle compartment. Thus, this cell serves as an ion-recovery ED cell.

Depending upon the redox potentials of the two redox couples being used, one of the two ED cells may operate as a discharging cell, in which the redox reactions occur spontaneously without the need for an energy input and generate an energy output. If the redox potential of the first redox couple (i.e., $A^{m+}/A^{(m+1)+}$ in FIG. 1B) is less positive than the redox potential of the second redox couple ($B^{n-}/B^{(n+1)-}$ in FIG. 1C), the equilibrium cell voltage $E_{cell}^e$ ($E_{cell}^e = E_{cathode}^e - E_{anode}^e$) of the ion-extraction cell where $A^{m+}/A^{(m+1)+}$ is present in the anolyte and $B^{n-}/B^{(n+1)-}$ is present in the catholyte is positive. In this case, this ion-extraction cell may be a discharging cell, provided that $E_{cell}^e$ is greater than the kinetic overpotential requirements and other voltage losses in the cell. FIG. 1B illustrates this specific case. However, the equilibrium cell voltage $E_{cell}^e$ ($E_{cell}^e = E_{cathode}^e - E_{anode}^e$) of the ion-recovery cell where $A^{m+}/A^{(m+1)+}$ is present in the catholyte and $B^{n-}/B^{(n+1)-}$ is present in the anolyte is negative. In this case, this ion-recovery cell is a charging cell, and the cell operation requires an energy input. FIG. 1C illustrates this specific case. If the difference between $E_{cathode}^e$ and $E_{anode}^e$ is smaller than the kinetic overpotential requirements and other voltage losses in the cell, both the ion-extraction cell and ion-recovery cell may require an energy input for cell operation.

When the same cell setup is used as the ion-extraction cell and ion-recovery cell, the ion extraction and ion recovery processes must occur sequentially. The amounts of ions that can be extracted and recovered in each process are determined by the amounts of redox species present in the anolyte and catholyte. To minimize the number of ion-extraction/ion-recovery cycles necessary to remove a given amount of salt in the feedwater, the concentrations of the redox couples or volumes of the anolyte and catholyte must be increased. However, if the redox couples are expensive, using a greater amount of the redox couple may be cost-prohibitive.

Figure 1D:
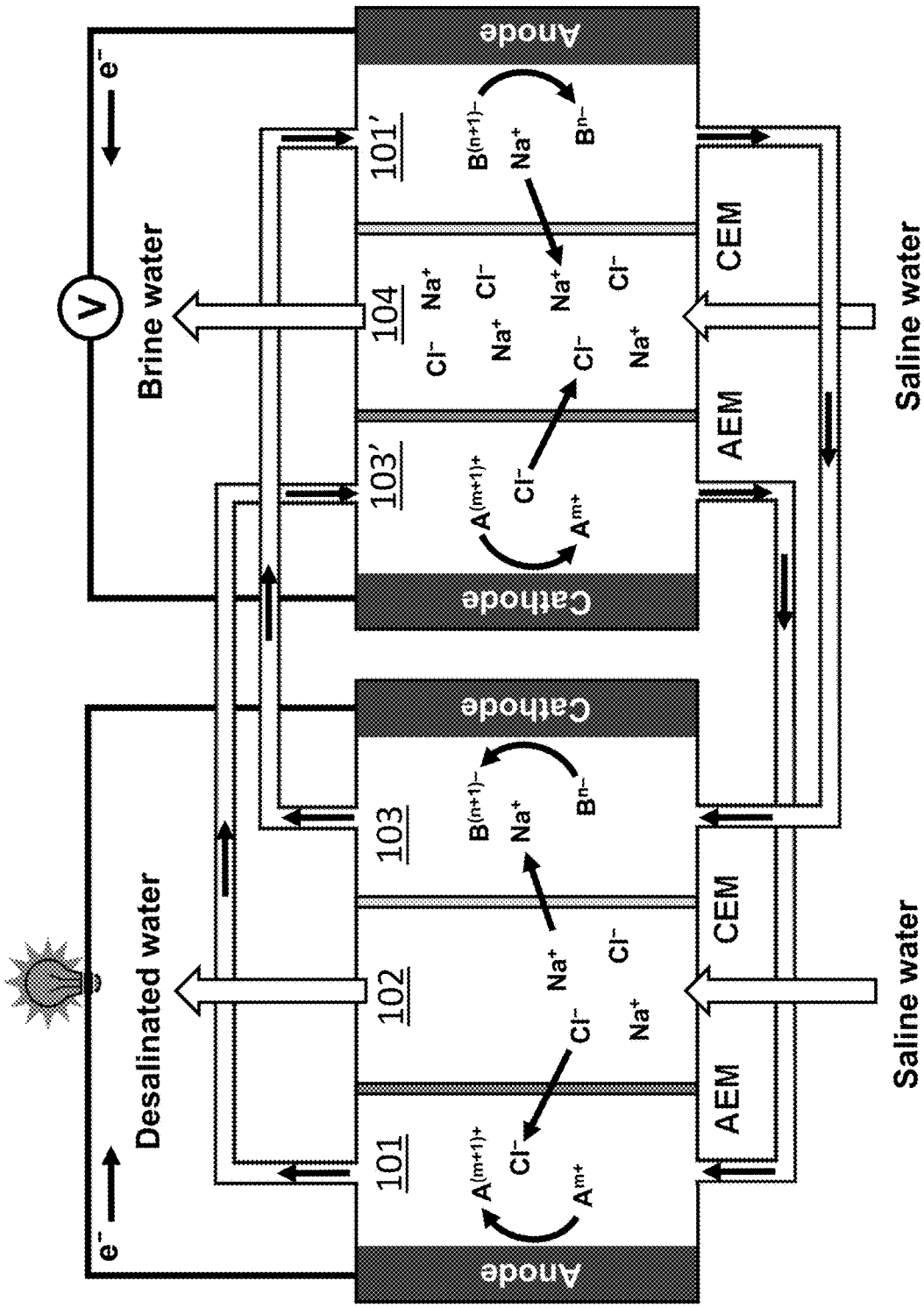

This issue can be addressed by operating the ion-extraction ED cell and the ion-recovery ED cell in tandem as shown in FIG. 1D. In this setup, the anolyte of the ion-extraction ED cell and the catholyte of the ion-recovery ED cell are shared and constantly circulated so that any change in the $A^{m+}/A^{(m+1)+}$ ratio and the Cl$^-$ concentration made in the anolyte of the ion-extraction cell can be exactly reversed in the catholyte of the ion-recovery cell. In the same manner, the catholyte of the ion-extraction ED cell and the anolyte of the ion-recovery ED cell are shared and circulated to maintain the same solution composition. Thus, this tandem ED cell design provides a possibility to achieve an unlimited amount of ion extraction with the use of a minimal amount of the redox couples.

Some embodiments of the ion-extraction and/or ion-recovery ED cells are designed as solar ED cells that convert solar energy into electricity, while carrying out the ion-extraction and/or ion-recovery processes of the system. This can be accomplished by replacing one or more of the electrodes in the ED cells with a photoelectrode. A photoelectrode is a semiconductor electrode that can absorb photons to generate photovoltage and photocurrent. An n-type semiconductor electrode can serve as a photoanode and a p-type semiconductor electrode can serve as a photocathode. A variety of photoelectrode materials can be used, provided that the materials are substantially stable in the electrolyte solution and have suitable valence band maximum (VBM) and conduction band minimum (CBM) for photo-oxidizing and/or photo-reducing the redox couples using photon-generated charge carriers. Ideally, the VBM and CBM of a photoelectrode straddle the redox potentials of the redox couples used in the anolyte and catholyte.

Figure 2A:
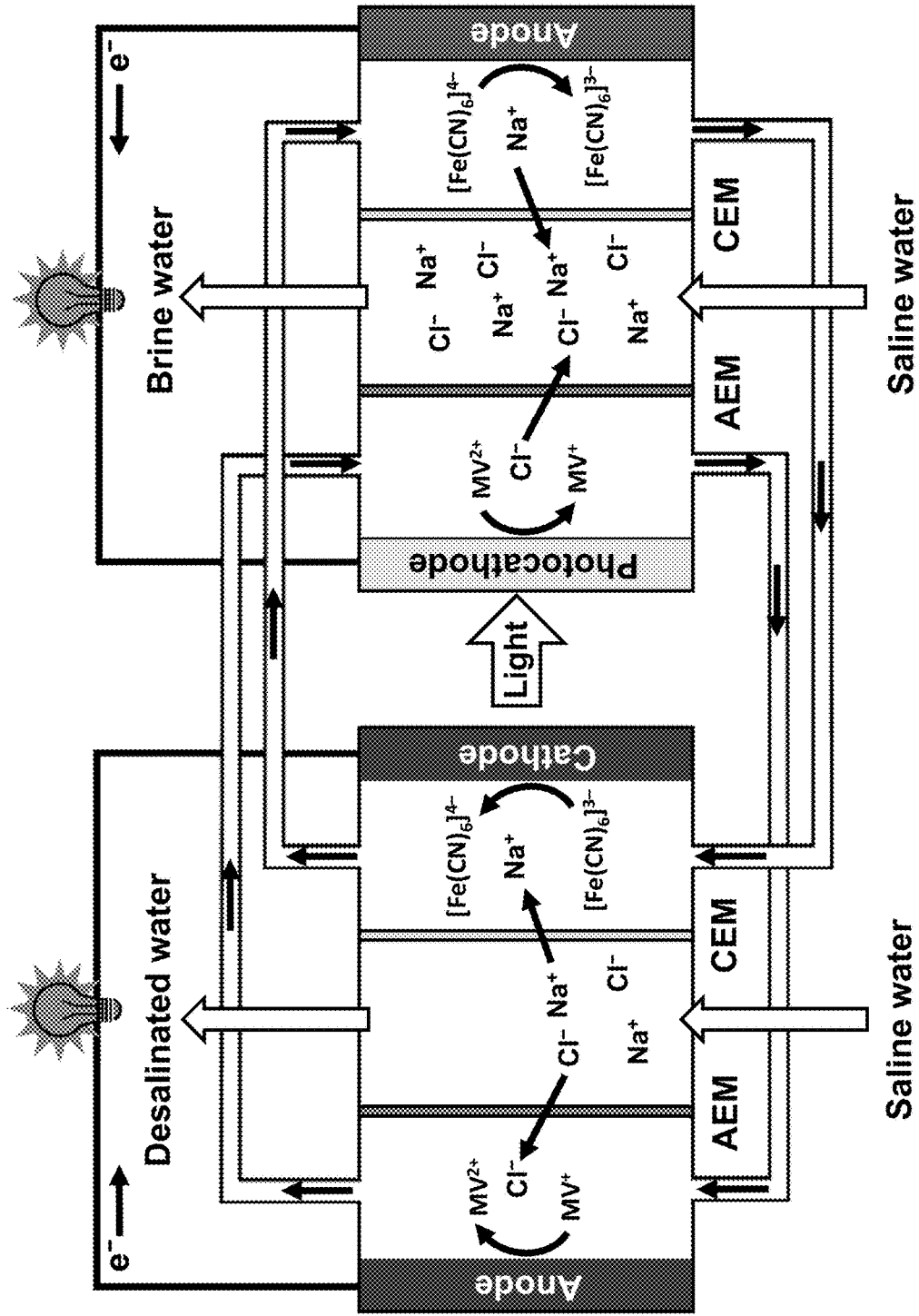
FIG. 2A shows a tandem cell system with an ion-extraction ED cell and an ion-recovery solar ED cell.

One embodiment of a solar-driven tandem ED cell system is shown in FIG. 2A. Here again, $Na^+$ and $Cl^-$ ions are used to demonstrate ion extraction and ion recovery. However, any cations or anions can be extracted or recovered. In the system of FIG. 2A, the ion-recovery ED cell operates as a solar ED cell having substantially the same design and principle of operation as the ion-recovery ED cell shown in FIG. 1D, except that the cathode of the ion-recovery ED cell is a photocathode. By way of illustration, the redox couple used in the anolyte of the ion-extraction ED cell and catholyte of the ion-recovery solar ED cell is $MV^+/MV^{2+}$ and the redox couple used in the catholyte of the ion-extraction cell and the anolyte of the ion-recovery solar ED cell is $[Fe(CN)_6]^{3-}/[Fe(CN)_6]^{4-}$ in FIG. 2A. Judging from the redox potentials of $MV^+/MV^{2+}$ and $[Fe(CN)_6]^{3-}/[Fe(CN)_6]^{4-}$, the ion-extraction cell is a discharging cell, and the ion-recovery cell is a charging cell that would require an energy input for cell operation. By replacing at least one of the electrodes in the ion-recovery ED cell with a photoelectrode, the operation of the ion-recovery cell is driven by solar energy and can generate an energy output.

By way of illustration, p-type $Cu_2O$ could be used as a photocathode in the ion-recovery solar ED cell of the solar-driven tandem ED cell system of FIG. 2A. The reduction potentials of both the $MV^+/MV^{2+}$ and $[Fe(CN)_6]^{3-}/[Fe(CN)_6]^{4-}$ couples lie between the CBM and VBM of $Cu_2O$. The two redox couples and the electrode replaced with a photoelectrode shown in FIG. 2A are for illustrative purposes only. Other redox couples could be used and other electrodes can be replaced with photoelectrodes.

Figure 2B:
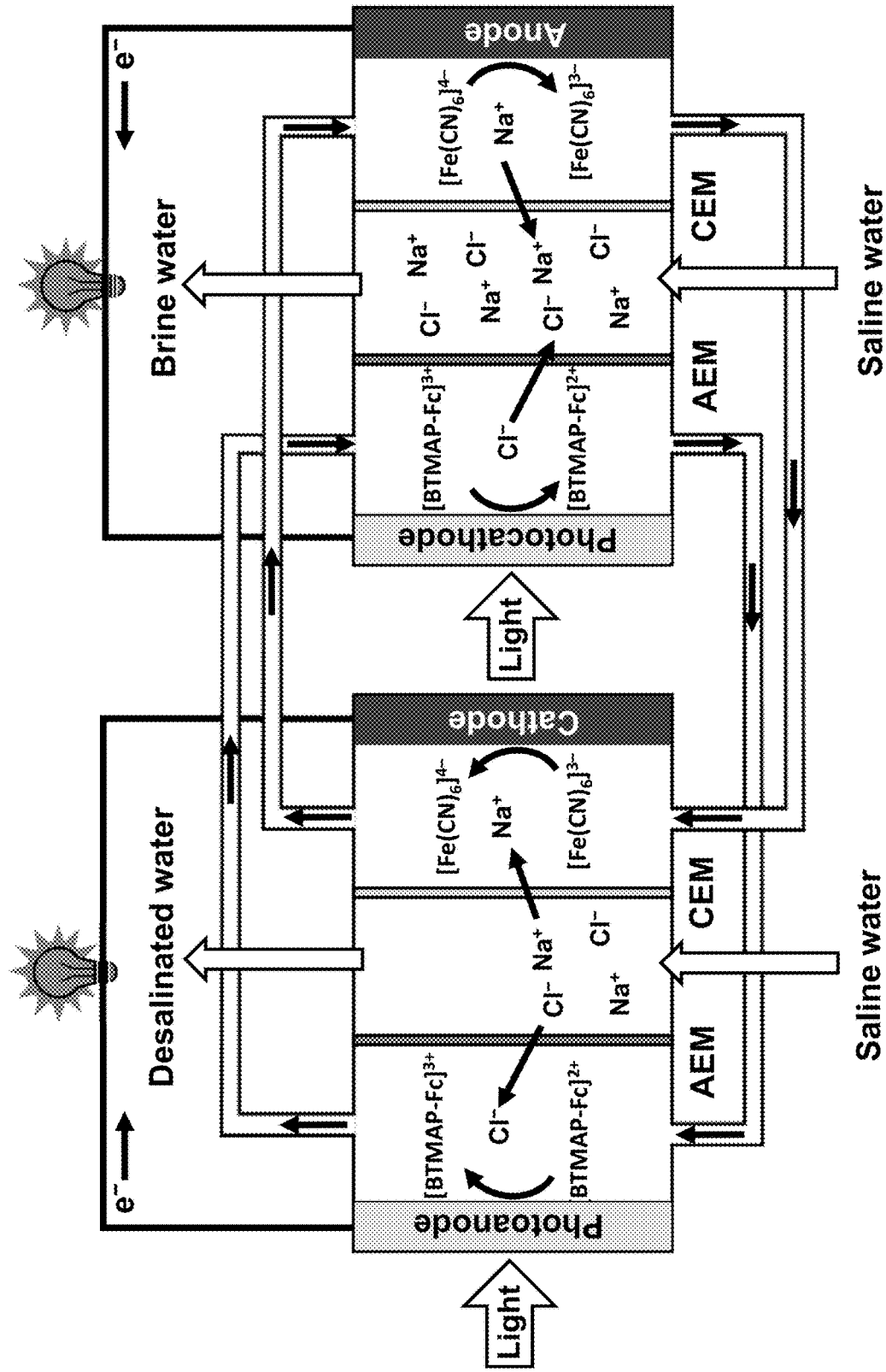
FIG. 2B shows a tandem cell system with an ion-extraction solar ED cell and an ion-recovery solar ED cell.

Another embodiment of a solar-driven tandem ED cell system is shown in FIG. 2B, wherein the anode in the ion-extraction ED cell is a photoanode, and the cathode in the ion-recovery ED cell is a photocathode. By way of illustration, the redox couple used in the anolyte of the ion-extraction ED cell is $[BTMAP-Fc]^{2+}/[BTMAP-Fc]^{3+}$ and the redox couple used in the catholyte of the ion-extraction ED cell is $[Fe(CN)_6]^{3-}/[Fe(CN)_6]^{4-}$. In this case, since the redox potentials of $[BTMAP-Fc]^{2+}/[BTMAP-Fc]^{3+}$ and $[Fe(CN)_6]^{3-}/[Fe(CN)_6]^{4-}$ are very close, operation of both the ion-extraction ED cell and ion-recovery ED cell will most likely require an energy input. When at least one of the electrodes in the ion-extraction ED cell and ion-recovery ED cell is replaced with a photoelectrode, the operation of one or both cells can be solar driven and one or both cells can operate without an energy input and may generate an energy output. By way of illustration, n-type $BiVO_4$ could be used as a photoanode in the ion-extraction solar ED cell, and p-type $Cu_2O$ could be used as a photocathode in the ion-recovery solar ED cell in the solar-driven tandem ED cell system of FIG. 2B. The redox potentials of the $[BTMAP-Fc]^{2+}/[BTMAP-Fc]^{3+}$ and $[Fe(CN)_6]^{3-}/[Fe(CN)_6]^{4-}$ couples lie between the CBM and VBM of n-type $BiVO_4$ and p-type $Cu_2O$. In other embodiments, the cathode of the ion-extraction cell or an anode of the ion-recovery cell or both may be photoelectrodes.

The operating principles of solar-driven ED cells can be summarized with reference to the ion-extraction ED cell in FIG. 2B for illustrative purposes. When the photoanode of the ion-extraction solar ED cell is illuminated by solar radiation, electrons in the valance band of the photoanode are excited to the conduction band, creating holes in the valance band. As a result, the photo-oxidation of the reduced species of the first redox couple takes place at the photoanode surface to fill in the holes in the valance band, and electrons flow from the conduction band of the photoanode to the cathode, generating photocurrent. At the cathode, reduction of the oxidized species of the second redox couple takes place. In this case, the anode and the cathode reactions occur spontaneously without the need for an electrical energy input, and the photocurrent and photovoltage are generated between the photoanode and the cathode of the ion-extraction solar ED cell only by illumination.

Figure 3:
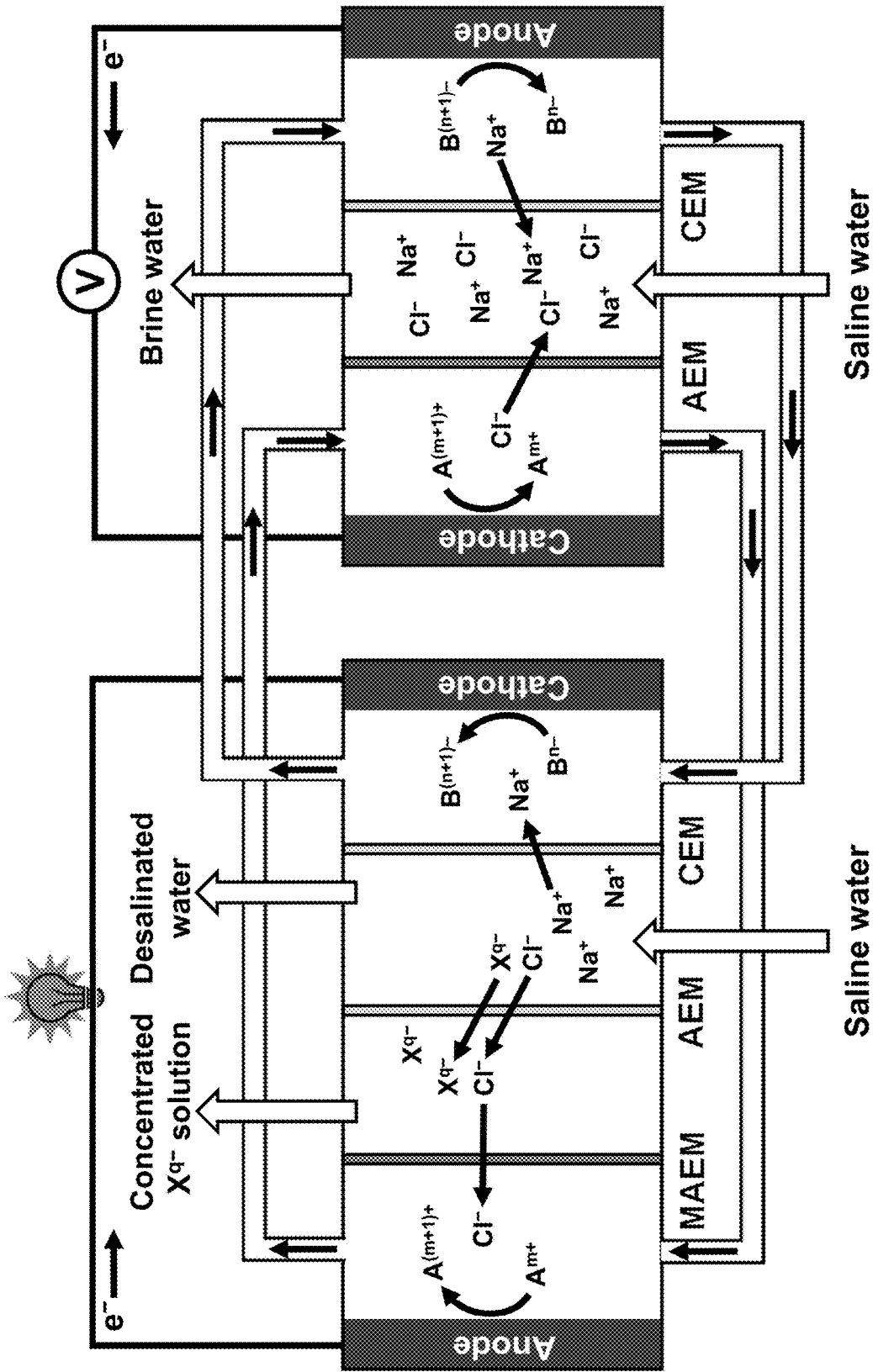
FIG. 3 shows an example of a tandem cell system that includes an ion-extraction ED cell having an additional compartment to separately concentrate monovalent and multivalent anions (represented as $X^{q-}$ with q>1) from a feed water containing dissolved $Cl^-$ and multivalent anions.

Although the embodiments of the ED cells depicted in FIGS. 1B, 1C, 1D, 2A, and 2B have only three compartments in the ion-extraction and ion-recovery ED cells, each ED cell can have more than three compartments, and the number of compartments in the ion-extraction ED cell and the ion-recovery ED cell need not be the same. One embodiment of a tandem ED cell system with a four-compartment ion-extraction ED cell and a three-compartment ion-recovery ED cell is shown in FIG. 3. The three-compartment ion-recovery ED cell is arranged and operates like the ion-recovery cell of FIG. 1D. However, the ion-extraction ED cell includes an additional compartment designed to concentrate multivalent anions (represented here generically as $X^{q-}$, where q>0) separately from monovalent anions like $Cl^-$. The additional cell compartment is disposed between the compartment into which the feed water solution enters the cell (the ion-extraction compartment) and the anolyte compartment. The additional cell compartment is separated from the ion-extraction compartment by an AEM and is separated from the anolyte compartment by a monovalent-selective anion exchange membrane (MAEM) that selectively passes monovalent anions. All anions from the ion-extraction compartment can enter the additional compartment through the AEM, but only monovalent anions can enter the anode compartment through the MAEM. Thus, multivalent anions, such as divalent and trivalent anions, become concentrated in the additional compartment. The solution containing concentrated multivalent anions can exit the ED cell and be used for other purposes. Many other variations are possible. For example, the ion-recovery ED cell could also have an additional compartment that could be used to separately concentrate species with different charges or sizes. As in FIGS. 1B, 1C, 1D, 2A, and 2B, ion-extraction and ion-recovery are illustrated using $Na^+$ cations and $Cl^-$ anions in FIG. 3, but the system of FIG. 3 could also be used to remove different cations and anions from a feed water solution that is free of $Na^+$ and/or $Cl^-$ ions.

Although the embodiments of the tandem cell systems shown in FIGS. 1D, 2A, 2B, and 3 each have a single ion-extraction ED cell and a single ion-recovery ED cell, the tandem cell systems can have more than one ion-extraction ED cell and/or more than one ion-recovery ED cell. In such multi-ED cell tandem systems, the ion-extraction ED cells and ion-recovery ED cells may be connected in series or in parallel in an alternating arrangement wherein the anode compartments of the ion-extraction ED cells are connected to the cathode compartments of the ion-recovery ED cells, and the cathode compartments of the ion-extraction ED cells are connected to the anode compartments of the ion-recovery ED cells via conduits that allow for the circulation of anolyte and catholyte between the ion-extraction and ion-recovery ED cells.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more." Therefore, embodiments in which "a" or "an" means one and embodiments in which "a" or "an" means more than one are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for extracting and recovering dissolved ions from solution, the method comprising:
    circulating a first solution comprising a reduced species and an oxidized species of a first redox couple between one or more anode compartments of one or more ion-extraction electrodialysis cells and one or more cathode compartments of one or more ion-recovery electrodialysis cells;
    circulating a second solution comprising a reduced species and an oxidized species of a second redox couple between one or more cathode compartments of the one or more ion-extraction electrodialysis cells and one or more anode compaitinents of the one or more ion-recovery electrodialysis cells, wherein the first and second redox couples are different redox couples;
    oxidizing the reduced species of the first redox couple in the one or more anode compartments of the one or more ion-extraction electrodialysis cells and reducing the oxidized species of the second redox couple in the one or more cathode compartments of the one or more ion-extraction electrodialysis cells, thereby causing anions from an ion-containing solution in an ion-extraction compartment of each of the one or more ion-extraction electrodialysis cells to move into the anode compartment of the ion-extraction electrodialysis cell and cations from the ion-containing solution to move into the cathode compaitinent of the ion-extraction electrodialysis cell; and
    reducing the oxidized species of the second redox couple in the one or more cathode compartments of the one or more ion-recovery electrodialysis cells and oxidizing the reduced species of the first redox couple in the one or more anode compai inents of the one or more ion-recovery electrodialysis cells, thereby causing anions from the anode compartment of each of the one or more ion-recovery electrodialysis cells to move into an ion-recovery compartment of the ion-recovery electrodialysis cell and cations from the cathode compartment of each of the one or more ion-recovery electrodialysis cells to move into the ion-recovery compaitment of the ion-recovery electrodialysis cell.

2. The method of claim 1, wherein the second redox couple comprises $[Fe(CN)_6]^{4-}$ and $[Fe(CN)_6]^{3-}$.

3. The method of claim 2, wherein the first redox couple comprises $[BTMAP\text{-}Fc]^{2+}$ and $[BTMAP\text{-}Fc]^{3+}$.

4. The method of claim 2, wherein the first redox couple comprises $(C_6H_7N)^{2+}$ and $(C_6H_7N)_2^{2+}$.

5. The method of claim 2, wherein the first redox couple comprises TEMPOL and $TEMPOL^+$.

6. The method of claim 1, wherein the ion-containing solution is saline water.

7. The method of claim 1, wherein the ion-containing solution is seawater.

8. The method of claim 1, wherein a cathode of at least one of the one or more ion-extraction and ion-recovery electrodialysis cells is a photocathode.

9. The method of claim 8, wherein the photocathode comprises p-type $CuO_2$.

10. The method of claim 1, wherein an anode of at least one of the one or more ion-extraction and ion-recovery electrodialysis cell is a photoanode.

11. The method of claim 10, wherein the photoanode comprises n-$BiVO_4$.

12. The method of claim 1, wherein the anions comprise chloride ions and the cations comprise sodium ions.

13. The method of claim 1, comprising two or more of the ion-extraction electrodialysis cells and two or more of the ion-recovery electrodialysis cells, wherein the two or more ion-extraction electrodialysis cells and the two or more ion-recovery electrodialysis cells are connected in series in an alternating arrangement.

14. The method of claim 1, comprising two or more of the ion-extraction electrodialysis cells and two or more of the ion-recovery electrodialysis cells, wherein the two or more ion-extraction electrodialysis cells and the two or more ion-recovery electrodialysis cells are connected in parallel in an alternating arrangement.

15. The method of claim 1, wherein the ion-extraction compartment of the one or more ion-extraction electrodialysis cells is directly adjacent to the anode compartment of the one or more ion-extraction electrodialysis cells.

16. The method of claim 1, wherein the ion-extraction compartment of the one or more ion-extraction electrodialysis cells is separated from the anode compartment of the one or more ion-extraction electrodialysis cells by an additional cell compartment.

* * * * *

UNITED STATES PATENT AND TRADEMARK OFFICE
CERTIFICATE OF CORRECTION

PATENT NO. : 11,964,885 B2
APPLICATION NO. : 17/172558
DATED : April 23, 2024
INVENTOR(S) : Kyoung-Shin Choi et al.

Page 1 of 1

It is certified that error appears in the above-identified patent and that said Letters Patent is hereby corrected as shown below:

In the Claims

Claim 1, Column 9, Line 44:
Delete the phrase "compaitinents" and replace with --compartments--.

Claim 1, Column 9, Line 58:
Delete the phrase "compaitinent" and replace with --compartment--.

Claim 1, Column 10, Line 5:
Delete the phrase "compai inents" and replace with --compartments--.

Claim 1, Column 10, Line 13:
Delete the phrase "compaitment" and replace with --compartment--.

Signed and Sealed this
Eighth Day of October, 2024

Katherine Kelly Vidal
*Director of the United States Patent and Trademark Office*